June 11, 1940.  E. H. LAND ET AL  2,203,687
APPARATUS EMPLOYING POLARIZED LIGHT FOR THE
PRODUCTION OF STEREOSCOPIC IMAGES
Filed May 11, 1938    3 Sheets-Sheet 1

INVENTOR
Edwin H. Land and
Joseph Mahler
By Brown & Jones
ATTORNEY

June 11, 1940.   E. H. LAND ET AL   2,203,687
APPARATUS EMPLOYING POLARIZED LIGHT FOR THE
PRODUCTION OF STEREOSCOPIC IMAGES
Filed May 11, 1938   3 Sheets-Sheet 3

Patented June 11, 1940

2,203,687

UNITED STATES PATENT OFFICE 2,203,687

APPARATUS EMPLOYING POLARIZED LIGHT FOR THE PRODUCTION OF STEREOSCOPIC IMAGES

Edwin H. Land, Boston, Mass., and Joseph Mahler, Nemecky Brod, Czechoslovakia, assignors, by mesne assignments, to Polaroid Corporation, Dover, Del., a corporation of Delaware Application May 11, 1938, Serial No. 207,182

11 Claims. (Cl. 88—16.6)

This invention relates to new and improved means for use in connection with the viewing of stereoscopic images.

An object of the invention is to provide apparatus of the character described employing polarized light.

A still further object of the invention is to provide a plurality of superimposed stereoscopic images or pictures or prints formed in light-polarizing material, each image, picture or print being visible when viewed through a suitable polarizing analyzer.

A still further object of the invention is to provide such a plurality of superimposed stereoscopic prints and means for viewing the superimposed plurality whereby the eyes of an observer are so screened that each eye sees one of the superimposed plurality only.

Other objects of the invention are to provide means for projecting upon a viewing screen the images carried by said superimposed plurality of polarizing elements under such conditions that one such image is formed in plane-polarized light vibrating in a direction substantially at right angles to the direction of vibration of the plane-polarized light forming the other of said images; to provide apparatus for viewing said superimposed images on said screen; to provide means for the projection of stereoscopic prints, including stereoscopic motion pictures employing standard projection apparatus; to provide such means wherein the film carrying said stereoscopic images is adapted to polarize light transmitted by said film so that the beams carrying one of said images vibrate in a direction substantially at right angles to the beams carrying the other of said images; and to provide such means wherein the full frame-size is employed for each of said stereoscopic images or prints.

Other objects of the invention contemplate the formation of the stereoscopic images in a polarized film by the removal or destruction of the polarizing properties of the film and the provision of superimposed polarizing films each bearing its stereoscopic image with the polarizing axis of one film substantially at right angles to the polarizing axis of the other film.

Other objects of the invention will in part be obvious and will in part appear hereinafter.

The invention accordingly comprises the apparatus embodying features of construction, combinations of elements and arrangement of parts, all as exemplified in the following detailed disclosure, and the scope of the application of which will be indicated in the claims.

For a fuller understanding of the nature and objects of the invention reference should be had to the following detailed description taken in connection with the accompanying drawings, in which.

Heretofore the use of polarized light in the projection of stereoscopic images, such for example as stereoscopic motion pictures, has been suggested. Two images have been provided with means to project each image separately upon a suitable viewing screen where the images are superimposed and viewed through polarizing analyzers. The projecting means heretofore suggested has comprised either a plurality of separate projectors or a single projector with means associated therewith for either splitting the rays emitted therefrom and carrying one image from those carrying the other image, or else the projector has been provided with means whereby first a right-eye image is projected, then a left-eye image, then a right-eye image, etc.

This invention contemplates the use of a projector such as is now employed in the projection of motion pictures, stills, or the like, without any change in the equipment associated with the projector. A new type of stereoscopic film or plate is provided, and this film or plate may be employed exactly as may the plate or film now used in the projection of two-dimensional images. Furthermore, the plate or film provided by the present invention may be useful in imparting a three-dimensional effect without a projector. It may, for example, be viewed directly through a suitable pair of analyzers and the stereoscopic effect thus obtained by the observer.

It will be apparent that the device of the present invention has widespread application commercially. The double image polarizing sheet hereinafter described may be employed effectively in advertising. It is widely useful in museum, technical and scholastic work, and it makes unnecessary a costly alteration in commercial motion picture apparatus if three-dimensional effects are to be produced.

If a design, image or picture is produced in a light-polarizing surface as by destroying the polarizing properties of the surface over predetermined areas thereof, or by physical removal of the polarizing surface over such areas, or by the development of the polarizing properties of the surface in varying degree thereover, the design or picture so produced becomes clearly visible if the polarizing surface is viewed through an analyzer with the polarizing axis of the analyzer crossed with that of the polarizing surface on which the image, design or picture is formed. Under such circumstances the field appears dark except over those areas where the polarizing properties of the surface have been destroyed, or not developed, and as to those areas the field appears light.

Figure 1:
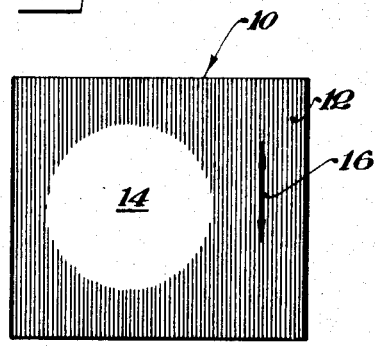
Figure 1 is a diagrammatic view of an image, for example a left-eye image, formed in a polarizing layer.

In Fig. 1, 10 represents generally a translucent or transparent element comprising a light-polarizing surface 12. This surface may be formed by applying to a support, which may or may not be transparent, a polarizing film in the manner heretofore known in the art, or the element 10 may comprise light-polarizing material, such for example as the material sold under the trade name "Polaroid," and comprising, for example, a suspension of minute oriented needle-shaped polarizing particles in a light-transmitting medium, or it may comprise any other means providing a light-polarizing surface. In the surface 12 there may be formed a design, print, image, or other indicia 14, and in the device shown in Fig. 1 this design, print or image will preferably be of a character adapted to form a left-eye stereoscopic image. For the purpose of illustration solely, the image shown in Fig. 1 is shown in the form of a circle. It will be understood that it may take any form and may comprise a full-tone reproduction, a half-tone reproduction, a line drawing, a photographic image, or any other type of image or design. It may comprise only a small portion of the light-polarizing surface 12, or it may comprise the entire surface.

For the sake of illustration, the light-polarizing surface 12 is shown in Fig. 1 as having its polarizing axis vertical or in the direction shown by the arrow 16. The image 14 may have been formed in this surface in any of a number of ways. The surface may, for example, have been cut or scraped from the supporting plate, or physically removed if no supporting plate is employed, or its polarizing properties may have been destroyed, as for example by treating the surface over predetermined areas thereof with a chemical or other agent adapted to alter or destroy the polarizing properties of the polarizing film comprising the surface. The surface 12 may, for example, have been treated with a solution or paste having the consistency for example of ink, and of a character adapted to destroy or alter the polarizing properties of the surface. This paste or solution may have been applied by brush strokes, or it may have been applied by preparing cuts, such as half-tone cuts, and coating them with the solution, and then printing the solution on to the polarizing surface, or a gelatin relief, such as is now employed commercially in motion picture manufacture, may have been used, and the solution adapted to destroy the polarizing properties of the polarizing surface may be applied thereto. The gelatin relief may then have been brought into contact with the polarizing surface. This process may take the form of continuous printing process.

Many materials and solutions may be employed in the processes described. Suitable solutions for use in such a process where the polarizing surface is formed of herapathite-like crystals may comprise solutions of the alkaloid forming the polarizing surface or of ammonium hydrosulfide, or of sodium iodide. These are mentioned as illustrative only, and it is to be understood that other solutions, pastes and the like may be employed.

So also the polarizing surface 12 may be coated with a thin film of a protective material, such for example as paraffin, and a half-tone plate, for example, may then be pressed against the coated surface with such force as to penetrate the coating. The surface may then in effect be etched by subjecting the element 10 to the action of a vapor or liquid adapted to destroy the polarizing properties of the surface 12. Where herapathite crystals are employed in the formation of the polarizing surface, this may be accomplished, in addition to the manner already described, by subjecting the element to the action of ammonia. The treated element may then be cleaned and the paraffin film removed.

It is to be understood that all of these processes are referred to as illustrative of means for forming in the polarizing coating or surface 12 an image or print. It is to be understood that total destruction of the polarizing properties of the treated areas is not essential, and that full-tone gradations may be effectively achieved by controlling the degree of destruction of the polarizing properties of these areas. It is also to be understood that while we have spoken of the destruction of the polarizing properties of the areas, the same effects may be obtained by controlling the degree of development of the polarizing properties, as for example by inhibiting the formation of polarizing areas over predetermined portions of the surface while permitting the formation of polarizing areas over the remainder thereof.

In Fig. 1 the lightly shaded area, i. e., the area 12, is to be taken as representative of a polarizing surface which has not been treated, while the area shown as clear, i. e., the area 14, is to be taken as illustrative of those portions of the surface of the element 10 which have had their polarizing properties destroyed or altered, or inhibited. If the polarizing axis of the area 12 is in the direction shown by the arrow 16, then the entire field, except the portions which are shown as at 14, will appear dark when viewed through an analyzer having its axis crossed with the axis of the area 12, and the design or image 14 will become clearly visible to an observer viewing the device with an analyzer so positioned.

Figure 2:
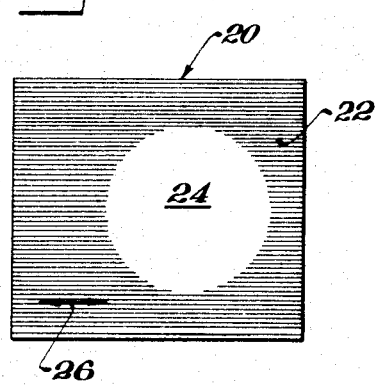
Fig. 2 is a similar view of another image, for example a corresponding right-eye image, formed in a similar layer.

In Fig. 2, 20 is intended to indicate generally an element like that shown at 10 in Fig. 1 having a polarizing surface 22 in which a right-eye stereoscopic image 24 is formed, the axis of the polarizing surface 22 being indicated by the arrow 26 as being at right angles to the direction of the axis of the surface 12 in Fig. 1.

If the device shown in Fig. 2 is viewed through an analyzer having its axis at right angles to the direction shown by the arrow 26, the design or image 24 becomes clearly visible to an observer.

Figure 3:
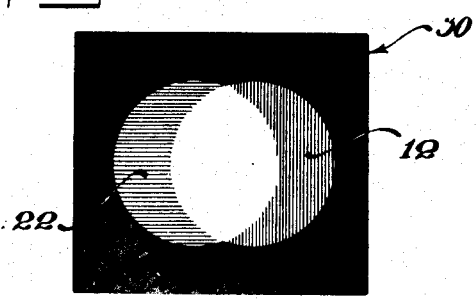
Fig. 3 is a diagrammatic view of the devices of Figs. 1 and 2 superimposed.

In Fig. 3 the devices shown in Figs. 1 and 2 are illustrated in superimposed relation, forming together a stereoscopic plate 30. If such a combination is viewed by an observer unequipped with an analyzer, those portions of the surface 12 which overlie the surface 22 appear black, for the polarizing axes of these surfaces are at right angles to each other, and if the elements 10 and 20 are superimposed, no light is transmitted over those areas where the polarizing surfaces are also superimposed. Over all other areas, i. e., the areas comprising either the surface 12 alone or the surface 22 alone, or those areas with respect to which the polarizing properties of both surfaces have been destroyed or are undeveloped, the field will appear light, as shown in Fig. 3.

While the two surfaces bearing respectively the right-eye and left-eye stereoscopic images are shown in Fig. 3 as superimposed to form a unitary element 30, it is to be understood that in other modifications of the invention these elements may be separated. It is not necessary that they form a unitary structure, nor need they be superimposed in substantial registry, as shown in Fig. 3. In fact, the degree of registry of the images 14, 24 will depend upon the stereoscopic effect which it is desired to achieve, and variations in this effect may be accomplished by altering the relative positions of the elements 10 and 20 in manners well known to the art.

Figure 4:
Fig. 4 is a diagrammatic view of the assembly of Fig. 3 as seen by an observer through a suitable left-eye filter.

Fig. 4 is a diagrammatic representation of the device shown in Fig. 3 as viewed through an analyzer having its axis parallel to the axis of the polarizing surface 22 and perpendicular to the axis of the polarizing surface 12. Such an analyzer would permit the user to see only the left-eye image 14, as will be explained in greater detail hereinafter.

Figure 5:
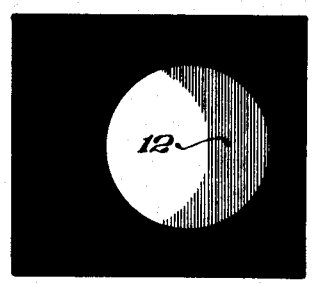
Fig. 5 is a view similar to Fig. 4 of the device of Fig. 3 as seen through a suitable right-eye filter.

Fig. 5 is a diagrammatic representation of the device shown in Fig. 3 when viewed through an analyzer having its axis perpendicular to the axis of the polarizing surface 22 and parallel to the axis of the polarizing surface 12. Such an analyzer would be one adapted for use in connection with the viewing of the right-eye stereoscopic image.

Figure 6:
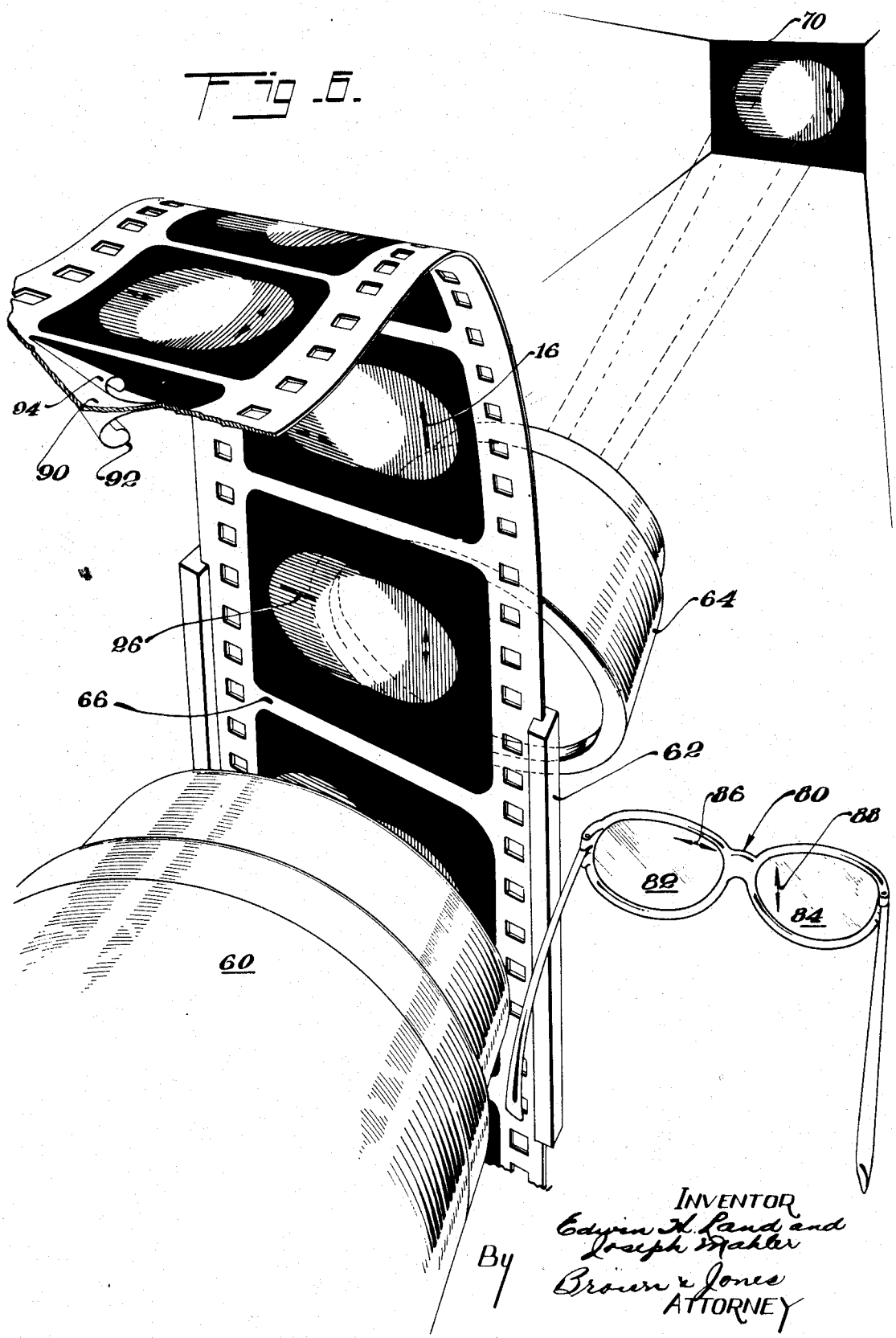
Fig. 6 is a diagrammatic view of apparatus of one kind adapted for the projection and viewing of stereoscopic images in accordance with the invention.

It will be apparent that if means are provided, such for example as the viewing glass 80 shown in Fig. 6, for providing a pair of polarizing analyzers, one positioned adjacent the left eye of an observer and the other positioned adjacent the right eye of an observer with their axes suitably positioned in the manner heretofore described, an observer so equipped will see with his left eye only the left-eye image, and will see with his right eye only the right-eye image, even though the images may be superimposed, as shown in Fig. 3. A stereoscopic effect is thus secured.

The plates or films bearing the stereoscopic images may be directly viewed by an observer equipped with a suitable analyzing device, or, as shown in detail in Fig. 6, they may be projected upon a suitable non-depolarizing screen 70 and viewed by many observers equipped with suitable analyzers 80.

In Fig. 6 there is shown diagrammatically a projector comprising a housing 60 for a light source, a film gate 62, and a suitable lens 64.

The structure shown is intended for example to be indicative of the standard motion picture projectors now employed. Such a device is adapted for the projection of stereoscopic images of the character heretofore described, either as stills or as motion pictures. In the device shown in Fig. 6, 66 is intended to indicate motion picture film, which may comprise a base portion 90 having two polarizing coatings 92, 94 thereon, the polarizing axes of said coatings being substantially at right angles to each other, and one coating carrying the left-eye image, the other coating carrying the right-eye image. In the form shown in Fig. 6, the base film 90 is provided with a coating on each face.

Figure 7:
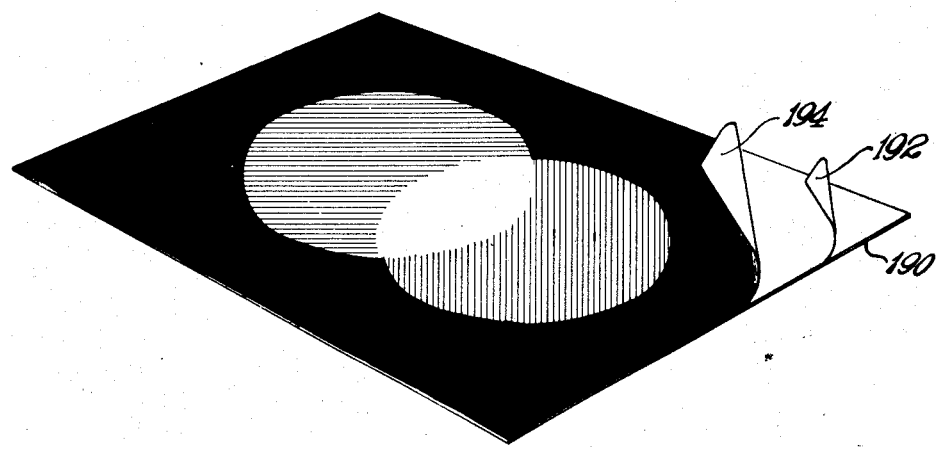
Fig. 7 is a diagrammatic view in perspective of a modification of the device shown in Fig. 3.
Figure 8:
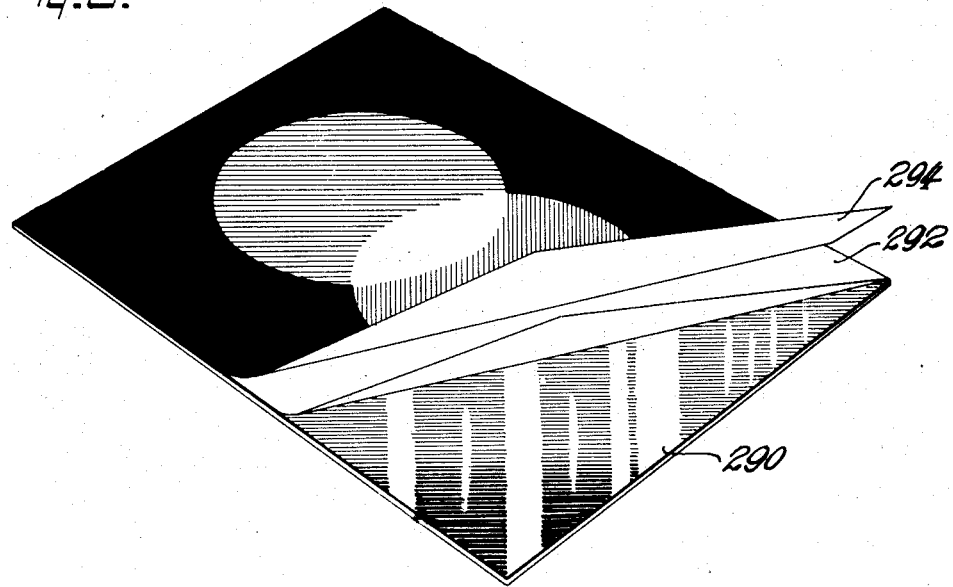
Fig. 8 is a similar diagrammatic view of a still further modification of the invention.

It will be apparent that devices falling within the scope of the invention may comprise a transparent base or support with a coating on each face, as shown in Fig. 6, or, as shown in Fig. 7, the support 190 may have both coatings 192, 194 superimposed on one face thereof, or the polarizing films may be of such thickness as to provide adequate strength where directly bonded to each other without an intervening support, as shown in Fig. 3, or other modifications of the invention may be employed.

Where the stereoscopic images are to be viewed directly, the support need not be transparent, but, as shown in Fig. 8, may be of paper or a reflecting material 290 or the like, and where the support is depolarizing or opaque, it is understood that both polarizing surfaces 292, 294 should be positioned on the same face of the support.

While the two polarizing surfaces 10, 20 have been described as carrying respectively a left-eye image and a right-eye image, it is to be understood that in general devices falling within the scope of the invention may be provided with two polarizing surfaces carrying merely different images. There may be a single plate, such for example as a plate of glass, carrying two such images, or there may be a continuous film, such as the film 66 in Fig. 6, carrying a succession of pairs of images.

The invention contemplates the use of all such devices, whether the two stereoscopic images are superimposed by the superimposition of separate elements carrying the images, or whether the images are superimposed by the formation of one image on each face, or both images on the same face of a single supporting structure. Under certain circumstances it is to be understood that the images need not be so superimposed as to lie in closely adjacent planes.

It is also to be understood that any means of producing the image or design on the polarizing surface of the image-carrying elements is to be deemed to fall within the scope of this invention. For example, in addition to the methods already described, the polarizing surface may be subjected to the effect of radiation of a character adapted to alter the polarization properties of the film over the areas to which the radiation has been applied.

With reference now to Fig. 6, the operation of the device will be specifically described in connection with the viewing of projected images, and its operation in connection with the direct viewing of the stereoscopic prints will be readily understood therefrom.

The two images are cast by the projector upon the viewing screen 70 in substantially superimposed relation. The observers are equipped with viewing glasses 80, which may comprise an ophthalmic frame provided with an analyzer 82 for the left eye and an analyzer 84 for the right eye. The polarizing axis of the analyzer 82, as shown by the arrow 86, is positioned substantially at right angles to the polarizing axis of the film carrying the left-eye image, as illustrated by the arrow 16, and the polarizing axis of the element 84, as shown by the arrow 88, is positioned substantially at right angles to the polarizing axis of the film carrying the right-eye image, as shown by the arrow 26.

In projection, light impinging upon so much of the areas of the polarizing surfaces as comprise superimposed portions which are adapted to substantially completely polarize transmitted light will be blocked at the film and will appear dark on the projection screen 70 to each eye of the observer. Light traversing those areas which are free or substantially free from a polarizing surface will appear bright on the screen, and since the light in such areas will be substantially unpolarized, it will traverse both the left-eye and right-eye analyzers in the viewing means 80. Light traversing those areas of the film which are covered by a single polarizing surface will be polarized to vibrate in the direction of the polarizing axis thereof, and if this direction is parallel to the axis of the analyzer 82, the light will traverse that analyzer and will be blocked by the analyzer 84, whereas if the direction of vibration of the light from the projector is parallel to the axis of the analyzer 84, it will be transmitted by that element and will be blocked by the analyzer 82.

It will be apparent that the left-eye image will be formed in part of substantially unpolarized light and in part of polarized light vibrating in the direction indicated by the arrow 86, whereas the right-eye image will be formed in part of substantially unpolarized light and in part of polarized light vibrating in the direction of the arrow 38. The shadows and darkened areas cooperating with the light transmitted by the analyzers to form the pictures or images are produced in part by the extinction of the light emanating from the projector at the film itself, because of the crossed polarizing elements in the film, and in part by the extinction of undesired polarized light at the respective left-eye and right-eye analyzers.

It will be understood that the stereoscopic pictures of the invention may be directly viewed without projection thereof, or if they are projected, they may be projected upon a reflecting surface, as shown in Fig. 6, or upon a so-called translucent, non-depolarizing screen, in which case rear projection apparatus of the usual commercial type may be employed.

Since certain changes in the constructions set forth which embody the invention may be made without departing from its scope, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described our invention, what we claim as new and desire to secure by Letters Patent is:

1. In combination, means providing a plurality of overlying surfaces, each surface comprising predetermined areas adapted to substantially polarize light transmitted thereby and each surface comprising other predetermined areas adapted to impart to transmitted light substantially less polarization than said first-mentioned areas, the said first-mentioned areas of each surface being positioned with their polarizing axes substantially at right angles to each other, whereby the overlying portions of said first-mentioned areas are adapted to substantially block light incident thereon, the areas of one surface being adapted to form in polarized light a predetermined image, and the areas of the other surface being adapted to form in differently polarized light a predetermined different image.

2. In combination, means providing a plurality of overlying surfaces, each surface comprising areas adapted to substantially polarize light transmitted thereby and each surface comprising other areas adapted to impart to transmitted light substantially less polarization than said first-mentioned areas, the said first-mentioned areas of each surface being positioned with their polarizing axes substantially at right angles to each other, whereby the overlying portions of said first-mentioned areas are adapted to substantially block light incident thereon, the areas of one surface being adapted to form in polarized light a left-eye image and the areas of the other surface being adapted to form in polarized light a right-eye image.

3. A device of the character described comprising, in combination, a support, means to provide a plurality of light-polarizing surfaces affixed to said support, each surface comprising areas adapted to substantially polarize transmitted light and other areas adapted to transmit light without substantial polarization, the polarizing axes of the polarizing areas of said surfaces being positioned substantially at right angles to each other, the polarizing areas of one of said surfaces being adapted to form in polarized light a predetermined design, and the polarizing areas of the other of said surfaces being adapted to form in differently polarized light a differently predetermined design.

4. A device of the character described comprising, in combination, a support, means to provide a plurality of light-polarizing surfaces affixed to said support, each surface comprising areas adapted to substantially polarize transmitted light and other areas adapted to transmit light without substantial polarization, the polarizing axes of the polarizing areas of said surfaces being positioned substantially at right angles to each other, the areas of each of said surfaces being adapted to form in polarized light a predetermined design, the said designs being respectively a left-eye and right-eye image.

5. A device of the character described comprising, in combination, a transparent support, means to provide a plurality of light-polarizing surfaces affixed to said support, each surface comprising areas adapted to substantially polarize transmitted light and other areas adapted to transmit light without substantial polarization, the polarizing axes of the polarizing areas of said surfaces being positioned substantially at right angles to each other, one of said surfaces being on one face of said support, the other of said surfaces being on the opposite face of said support, the polarizing areas of one of said surfaces being adapted to form in polarized light a predetermined design, the polarizing areas of the other of said surfaces being adapted to form in differently polarized light a different predetermined design.

6. A device of the character described comprising, in combination, a film of transparent plastic material having affixed thereto means to provide a plurality of overlying light-polarizing surfaces, each surface comprising areas adapted to substantially polarize transmitted light and other areas adapted to transmit light without substantial polarization, the polarizing axes of the polarizing areas of said surfaces being substantially at right angles to each other the polarizing areas of one surface being adapted to form in polarized light a predetermined design, the polarizing areas of the other of said surfaces being adapted to form in differently polarized light a different predetermined design, and a predetermined portion of the polarizing areas of said surfaces overlying each other to substantially block light incident thereon.

7. A device of the character described comprising, in combination, a support, means to provide a plurality of light-polarizing surfaces affixed to said support, each surface comprising areas adapted to substantially polarize transmitted light and other areas adapted to transmit light without substantial polarization, the polarizing axes of the polarizing areas of said surfaces being positioned substantially at right angles to each other, the areas of each of said surfaces being adapted to form in polarized light a predetermined design, the said designs being respectively a left-eye and right-eye image and being so superimposed that said left-eye and right-eye images are in substantial registry.

8. In combination, means providing a plurality of overlying surfaces, each surface comprising areas of polarizing material adapted to form a predetermined image in polarized light, one of said images differing predeterminedly from the other of said images, the said areas of one surface being positioned with their polarizing axes substantially at right angles to the said areas of the other surface, and viewing means comprising a plurality of non-overlying light-polarizing areas, one of said areas being positioned with its polarizing axes substantially parallel to the polarizing axes of the areas comprising one of said surfaces, and the other of said viewing means being positioned with its polarizing axis substantially at right angles thereto.

9. In combination, means providing a transparent support, means thereon providing a plurality of overlying surfaces, each surface comprising areas of polarizing material adapted to form a predetermined image in polarized light, said images differing predeterminedly, the said areas of one surface being positioned with their polarizing axes substantially at right angles to the said areas of the other surface, said images being positioned to overlie one another with portions of one in substantial registry with corresponding portions of the other, and viewing means comprising a plurality of non-overlying light-polarizing areas, one of said areas being positioned with its polarizing axis substantially parallel to the polarized axes of the areas comprising one of said surfaces, and the other area of said viewing means being positioned with its polarizing axis substantially at right angles thereto.

10. In combination, means providing a surface comprising light-polarizing areas adapted to form in polarized light a predetermined left-eye stereoscopic image, means providing a surface comprising light-polarizing areas adapted to form in differently polarized light a predetermined right-eye stereoscopic image, means to position said surfaces in superimposed relation, and means to view said superimposed surfaces comprising a plurality of spaced light-polarizing elements so positioned that when an observer uses said viewing device one of said elements blocks from the left eye of the observer the polarized portion of light carrying the left-eye image, and the other of said elements blocks from the right eye of the observer the polarized portion of light carrying the right-eye image.

11. In combination, a projector, a viewing screen, means interposed in the path of light emanating from said projector and incident on said screen comprising a transparent element providing a plurality of light-polarizing surfaces, each surface comprising light-polarizing areas adapted to form, in polarized light, a predetermined image, one of said images being a left-eye stereoscopic image, the other of said images being a right-eye stereoscopic image, the polarizing axis of one of said surfaces being substantially at right angles to the polarizing axis of the other of said surfaces, the images carried by said surfaces being substantially superimposed, and an analyzer for viewing said projected images comprising an ophthalmic mounting provided with two light-polarizing elements, one positioned before one eye of the observer, the other positioned before the other eye of the observer, said elements being positioned with their polarizing axes substantially at right angles to each other.

EDWIN H. LAND.
JOSEPH MAHLER.